United States Patent [19]

Maeda et al.

[11] Patent Number: 4,814,227
[45] Date of Patent: Mar. 21, 1989

[54] ADHESIVE SHEET FOR PREVENTING AQUATIC GROWTHS AND METHOD FOR PREVENTING AQUATIC GROWTHS

[75] Inventors: Kunio Maeda, Kiyose; Hiroyasu Miyasaka, Tanashi; Yasuaki Kitazaki, Iruma; Takafumi Yamada, Saitama; Terumi Nakata, Tokyo; Hiroo Sato, Osaka, all of Japan

[73] Assignee: Nichiban Company Limited, Tokyo, Japan

[21] Appl. No.: 897,912

[22] Filed: Aug. 19, 1986

[30] Foreign Application Priority Data

Aug. 19, 1985 [JP] Japan .................................. 60-180488

[51] Int. Cl.[4] .......................... C09J 3/02; B32B 15/08
[52] U.S. Cl. ...................................... 428/353; 428/344; 428/354; 428/416; 428/907; 156/71; 156/233
[58] Field of Search .............. 428/907, 353, 462, 416, 428/418; 156/71, 233

[56] References Cited

U.S. PATENT DOCUMENTS

| Re. 29,072 | 12/1976 | Zondek | 114/222 |
| Re. 30,771 | 10/1981 | Zondek | 156/196 |
| 3,761,334 | 9/1973 | Zondek | 156/71 |
| 4,035,546 | 7/1977 | Ruppert, Jr. | 428/907 X |
| 4,129,610 | 12/1978 | Kobayashi et al. | 428/907 X |
| 4,389,460 | 6/1983 | Dawans et al. | 428/462 X |
| 4,428,989 | 1/1984 | Marshall | 428/907 X |
| 4,599,368 | 7/1986 | Kimmel et al. | 428/907 X |

Primary Examiner—George F. Lesmes
Assistant Examiner—M. A. Katz
Attorney, Agent, or Firm—Bruce L. Adams; Van C. Wilks

[57] ABSTRACT

To prevent the growth of aquatic animals and plants on the surfaces of underwater structures, the surfaces are covered with a protective adhesive sheet comprised of a copper-nickel alloy plate having a weight ratio of copper:nickel in the range of 100:0 to 80:20, a primer layer formed on the alloy plate, and a pressure-sensitive adhesive layer formed on the primer layer. Prior to applied the adhesive sheet, the surface to be protected is preferably cleaned and coated with a primer of the same composition as that of the primer layer of the adhesive sheet.

9 Claims, 1 Drawing Sheet

# ADHESIVE SHEET FOR PREVENTING AQUATIC GROWTHS AND METHOD FOR PREVENTING AQUATIC GROWTHS

BACKGROUND OF THE INVENTION

(1) Field of the Invention

The present invention relates to adhesive sheets for proctecting against aquatic growths, such as animal and plant growths, which attach and propagate on the surface of ships and other structures in contact with water.

(2) Description of the Prior Art

Usually, on the surface of ships and other underwater structures, animals such as barnacles, mussels, oysters, pearl-oysters and the like, as well as plants such as various kinds of seaweeds and the like, will attach themselves and propagate along the surface. Such animal and plant growths impede navigation and promote deterioration of the surface and, therefore, various measures have been taken to prevent the adhesion and propagation of these animals and plants. For example, there has been proposed a method of applying paint containing a poisonous substance which slowly dissolves in small amounts in sea water; however, this method is disadvantageous because the paint must be recoated every 1–2 years to continue the effect of preventing the adhesion. Also, a method for preventing the adhesion of noxious animals and plants by using copper plate is known; however, since the chemical reaction between copper and sea water proceeds comparatively rapidly, this method, suffers the drawback of durability unless a fairly thick copper plate is used. Consequently, this method is not practical from a commercial point of view.

SUMMARY OF THE INVENTION

The inventors have studied the feasibility of alloying copper with another metal to minimize the dissolving out of copper ions into sea water and of using a copper alloy plate to withstand the corrosion due to sea water for extended periods, as well as ways to simplify the attachment of the copper alloy plate onto the underwater structures in order to provide a commercially suitable adhesive sheet for the prevention of aquatic growths which has excellent durability.

According to the present invention, one surface of a copper-nickel alloy plate having a weight ratio of copper-nickel in the range of 100:0 to 80:20 is provided with a pressure-sensitive adhesive layer and a special primer layer to form a sheet which effectively prevents the adhesion and propagation of aquatic growth, which minimizes the dissolving out of copper ions into sea water, which is easy to attach, and which is durable for use over long periods of time.

DETAILED DESCRIPTION OF THE PREFERRED EMBODIMENT

Figure 1:
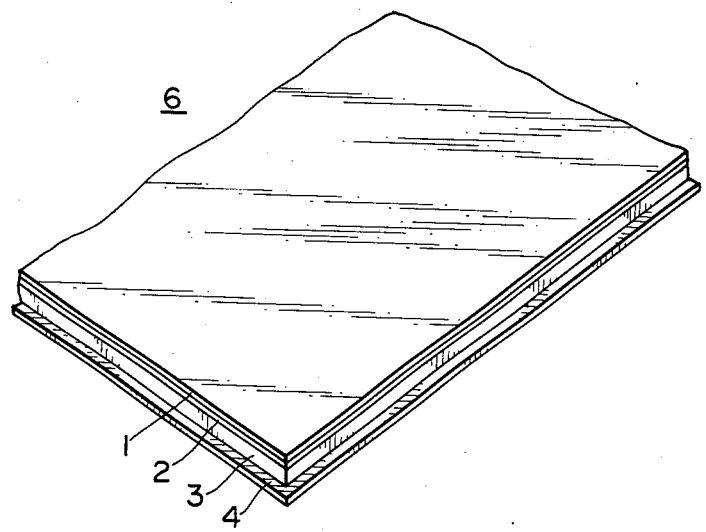
FIG. 1 is a perspective view showing a part of an adhesive sheet for prevention of aquatic growth according to the present invention.
Figure 2:
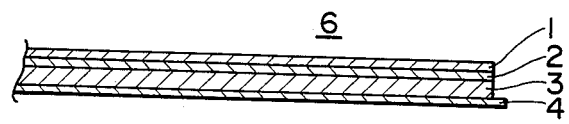
FIG. 2 is a cross-sectional view of FIG. 1.

An adhesive sheet 6 for the prevention of aquatic growths comprises a copper-nickel alloy plate 1 as a base material, the ratio of copper:nickel being in the range of 100:0 to 80:20 by weight. One surface of the copper-nickel alloy plate 1 is primer treated to form a special primer layer 2 on which a pressure-sensitive adhesive layer 3 having waterproof and weatherproof properties is provided. A removable release paper 4 is attached, as occasion demands, to the exposed surface of the pressure-sensitive adhesive layer 3.

If the thickness of the copper-nickel alloy plate 1 forming the base material is more than 0.05 mm, the plate will have sufficient strength for use according to the present invention. The years of life of the plate are proportional to its thickness. For example, the life of an alloy plate of about 0.1 mm thick and having a copper-nickel content of 90:10 is about 5–10 years. In case the content of copper in the alloy is 100%, the dissolving speed of copper ions in sea water is high, and the effect of prevention against aquatic growth is excellent; however, the years of life thereof are comparatively shorter than those of an alloy containing a predetermined quantity of nickel.

The main components of the primer layer 2 include an elastomer, a tackifier resin, an epoxy resin and a curing agent for the epoxy resin, and, as occasion demands, an anti-degradation agent for the pressure-sensitive adhesive which protects it against degradation by cooper and an anti-aging agent can be added. These components are mixed in suitable quantity and dissolved in one, two, or more organic solvents, such as toluene, ethyl acetate, methyl ethyl ketone, acetone, isopropanol and the like, to form an about 1–50% (weight %) primer solution.

The primer solution is applied, such as by painting, on the surface of the base material so as to form a solid primer layer of about 1–20 g/m$^2$, and preferably about 3–10 g/m$^2$. As the elastomer, epoxy modified natural rubber, (modified) methyl methacrylate grafted natural rubber, styrene-butadiene rubber, nitrile rubber, chlorinated rubber and its modified rubber and the like can be used. The tackifier resin may comprises those resins used as tackifier resins in the pessure-sensitive adhesive layer 3 (described hereinbelow) as well as phenol resin and the like. As the epoxy resin, polyfunctional epoxy compounds such as ethylene glycol diglycidyl ether, propylene glycol diglycidyl ether, 1,6 hexanediol diglycidyl ether and the like can be employed, and as curing agents for these epoxy resins, there are polyamines such as diethylene triamine, triethylene tetramine, diethyl aminopropylamine, polyamide such as "Varsamid 110", "Varsamid 125", "Varsamid 140" sold by the General Mills Company, and "Lancast A" sold by the Ciba Geigy Company, polycarboxylic anhydrides such a phthalic anhydride, dodecyl succinic anhydride, methylnadic anhydride, methyl tetrahydro phthalic anhydride, polysulfide, polymercaptan, dicyandiamine, resol type or novolak type phenol resins and imidazole compounds such as 2-ethyl-4-methyl imidazole, and 1-cyanoethyl-2-phenyl imidazole, and these compounds are blended to form polyepoxy compounds with an epoxy eqivalent.

The blending ratio of the elastomer, tackifier resin and epoxy resin which form the primer layer 2 is typically 100 weight parts of elastomer, 20–300 weight part of tackifier resin and 30–200 weight parts of epoxy resin. These components are blended together, and then a curing agent corresponding to the epoxy equivalent is blended therewith. For the antioxidant to the blended in the primer layer, the same antioxidant substances used to form the pressure-sensitive adhesiver layer 3 (described hereinbelow) may be used, and the blending quantity is about 0.5–5 weight parts to 100 weight parts of elastomer. And, as the anti-degradation agent against copper, there are N-isopropyl-N'-phenyl-p-phenylene diamine, N,N'-diphenyl-p-phenylene diamine, N,N'-di-2-naphthyl-p-phenylene diamine and the like, and their blending quantity is about 0.1–3 weight parts to 100 weight parts of elastomer.

The pressure-sensitive adhesive layer 3 is formed of elastomer, tackifier resin, vulcanizing agent, antioxidant and the like as the main materials, and the thickness of the layer 3 is about 20–1000μ, and preferably about 100–400μ. The formation of the pressure-sensitive adhesive layer 3 is preferably by means of a solventless system because when formed by means of a solvent system, the residual solvent, which requires much time for drying, may exert a bad influence upon durability. It is particularly preferable that the pressure-sensitive adhesive layer 3 be of the cross-linking type to obtain long durability.

The elastomer component of the pressure-sensitive adhesive layer 3 should have good weatherability and waterproof properties. Suitable materials include natural rubber, (modified) methyl methacrylate grafted natural rubber, polyisobutylene rubber, butyl rubber, styrene-butadiene rubber, styrene-isoprene-styrene block copolymer rubber, styrene-ethylene-butylene-styrene block copolymer rubber, reclaimed natural rubber, reclaimed butyl rubber.

For the tackifier resin, there are polyterpene resin, terpene phenol resin, resins of the rosin group, resins of the rosin ester group and their hydrogenated derivatives resins, and petroleum resin, such as $C_5$ series petroleum resin, $C_5$–$C_9$ co-polymerised series resin, $C_9$ series petroleum resin and their hydrogenated resins, and in case a prolonged period weatherability property is needed, hydrogenated resin is particularly preferable.

As vulcanizing agent and auxiliary agent of vulcanization which are added for making the pressure-sensitive adhesive into a cross-linking structure, there are the resin type, such as reactive phenol resin, and the sulphur type. Fillers, such as clay, zinc white, calcium carbonate, magnesium carbonate, carbon black, and silicate, are added to promote the vulcanizing effect as well as a weighting and reinforcement effect. For the antioxidant, compounds of the amine group, alkyl phenol group, thiourea group and benzimidazol group may be suitably used.

The pressure-senitive adhesive sheet of the present invention, which is formed as above mentioned, is applied to an underwater structure such as the hull of a fiber-reinforced plastic vessel such as a yacht, by preliminarily cleaning the hull to fully remove all contamination which is harmful to the adhesion of the pressure-sensitive adhesive so that no clearance will exist between the pressure-sensitive adhesive sheets and the hull. This enables the sheets to adhere to the hull in intimate contacting relation so that no bubbles exist between the hull surface and the adhesive sheets. In this case, if the sticking surface of the pressure-sensitive adhesive sheet is preliminarily primer-processed, a much stronger adhesive bond can be effected. This primer layer is formed by using a primer solution applied to the surface to the base material and similarly processed to form the necessary primer layer.

Several embodiments will be described hereinafter.

EXAMPLE 1

Raw material having the following blending ratio was placed into an enameled container and mixed by stirring for about 5 hours to obtain a primer solution.

| | |
|---|---|
| Heveaplus Mg-30*[1] | 100 g |
| Arkon P-100*[2] | 100 g |
| Epicoate 828*[3] | 125 g |
| Epicure DX102*[4] | 75 g |
| Sumilizer MDP*[5] | 1 g |
| Nocrac white*[6] | 0.5 g |
| Toluene | 450 g |
| Methyl ethyl ketone | 450 g |

Footnotes:
*[1]Trade name of natural rubber grafted with 30% by weight methyl methacrylate made by Ito Shoji Company Limited.
*[2]Trade name of hydrogenerated petroleum resin (softening point 100° C.) made by Arakawa Chemical Industries, Limited.
*[3]Trade name of polyepoxy compound made by Uka Shell Epoxy Kabushiki Kaisha.
*[4]Trade name of curing agent of epoxy resin made by Uka Shell Epoxy Kabushiki Kaisah
*[5]Trade name of bisphenol group antioxidant made by Sumitomo Chemical Company, Limited.
*[6]Trade name of amine group antioxidant made by Ouchi-Shinko Chemical Industry Co., Ltd.

The above-mentioned primer liquid solution was applied on one surface of a copper-nickel alloy plate having a copper:nickel weight ratio of 90:10, and a width 400 mm × length 10 m × thickness 0.1 mm. Then a pressure-sensitive adhesive layer of the following composition was applied on the primer layer by a calender roll so that its thickness became 150μ, and a removable release paper was stuck on the pressure-sensitive adhesive layer to form an adhesive sheet. The adhesive sheet was coiled on a paper tube of about 3 inch bore to obtain a roll of pressure-sensitive adhesive sheet for prevention against aquatic growths according to the present invention. The adhesive sheet exhibited a 180° peel adhesion to a fiber-reinforced plastic plate (FRP) of 3 mm thick of 2.6 kg/25 mm (measuring temperature 23° C., 65% relative humidity). The primer solution was applied by painting on the FRP plate 3 mm thickness so that the applied amount after drying became 4–6 g/m², and the 180° peel adhesion of the adhesive sheet to the thin primer layer forming surface was 7.5 kg/25 mm and, due to the formation of the primer layers, the adhesion and the durability between the alloy plate base material and the adhesive agent was significantly stabilized. Blending of an adhesive agent:

| | |
|---|---|
| Natural rubber (smoke coat) | 100 part (weight) |
| Calcium carbonate | 70 part (weight) |
| Zinc white | 30 part (weight) |
| Carbon black | 3 part (weight) |
| Supper ester L*[7] | 30 part (weight) |
| Process oil | 10 part (weight) |
| Arkon P-100*[2] | 100 part (weight) |
| Alkylphenol disulfide | 5 part (weight) |
| Dibutylditho zinc carbamete | 1 part (weight) |
| Sumilizer MDP*[5] | 3 part (weight) |

Footnotes:
*[7]Trade name of liquid rosinester resin made by Arakawa Chemikal Industries, Limited
*[2], *[5]same as mentioned above for the primer blending After the primer liquid was applied on both the front and back major surfaces of the FRP plate of length 300 mm × width 210 mm × thickness 3 mm (the applied amount after drying being 4–6 g/m²), the adhesive sheet of the present invention was caused to adhere on primer layers of both the front and back surfaces of the FRP plate, and the plate was suspended at a depth of 1 m in sea water in the laboratory of our company for one year and the condition of adhesion of aquatic growths was observed. After the lapse of one year, there was no adhesion of any aquatic growth and no peeling from the surface by the adhesive sheet.

Further, the primer liquid solution was applied on a FRP plate of 50 mm length×125 mm width×3 mm thickness so that after drying, its application amount was 4–6 g/m². After drying, 20 samples were prepared, on which test pieces of the adhesive sheet of the present invention of 25 mm width were caused to adhere, and these samples were immersed in salt water of 3.5% concentration held at a temperature of 40° C. and the change was investigated with the lapse of time. As a result, the 180° peel adhesion after one month was 7.6 kg/25 mm, which represents almost no change.

COMPARATIVE EXAMPLE 1

A FRP plate of length 300 mm×width 210 mm×thickness 3 mm was suspended at a depth of 1 m in sea water for one year in the same manner as Example 1, and the condition of adhesion of aquatic growths was observed. After one year, a remarkable adhesion of barnacles and seaweed was found.

EXAMPLE 2

Similar to Example 1, a primer liquid was applied on the surface of a copper plate of 400 mm width×10 m length×0.1 mm thickness to form a primer layer similar to that of Example 1. A similar pressure-sensitive adhesive layer was provided on the primer layer over which a release paper was applied to obtain an adhesive sheet for prevention of aquatic growths according to the present invention. Similar to Example 1, the peel adhesion and condition of adhesion of aquatic growths were tested, and the results were as follows. No adhesion of aquatic growths was found after leaving the adhesion sheet immersed in sea water for one year. The 180° peel adhesion to the FRP plate was 2.4 kg/25 mm and the 180° peel adhesion to the primer-processed FRP plate was 7.6 kg/25 mm, immersed in salt water of 3.5% concentration at 40° C. temperature, and the 180° peel adhesion after one month was 7.4 kg/25 mm, showing almost no change.

COMPARATIVE EXAMPLE 2

An adhesive sheet was made similar to those described in Example 1, except that no primer layer was formed between the pressure-sensitive adhesive layer and the adjoining surface of the base material of copper-nickel alloy plate. The thus prepared adhesive sheet, which had no primer layer, was applied to both the front and back major surfaces of a FRP plate of length 300 mm×width 210 mm×thickness 3 mm, and the FRP plate was then immersed at a depth of 1 m in sea water in the laboratory of our company for one year as in Example 1. The results were that on the front surface of the FRP plate, the adhesive sheet was strongly adhering or sticking and on this surface no aquatic growths was found; however, on the back surface of the FRP plate, the adhesive sheet was peeled off and on the exposed surface of the FRP plate, barnacles and seaweeds were attached. Moreover, the 180° peel adhesion to the FRP plate after immersion for one month in sea water of 3.5% concentration at 40° C. temperature was significantly inferior relative to the 180° peel adhesion of Examples 1 and 2.

As mentioned above, the adhesive sheet for the prevention against aquatic growths according to the present invention is outstanding in preventing the adhesion of aquatic growths and exhibits almost no degradation of adhesion during prolonged immersion in sea water and thus has an adhesion performance with excellent durability.

The adhesive sheet of the present invention may be easily stuck or caused to adhere on the water-contacting surfaces of steel plate ships, wooden ships, reinforced plastic ships, ferrocement ships and other ships, and the adhesive sheet exhibits no degradation due to oxidation of the pressure-sensitive adhesive. Thus the copper or copper alloy plate may be safely and surely held on the outside surface of the hull of the ship without falling off, and the attachment and propagation of mussels, barnacles, seaweeds and other growths may be prevented. Further, corrosion of the hull comprised of steel plates and the like and other underwater structures can be effectively prevented. The adhesive sheet has an excellent effect when applied to other then ships, for instance, steel piles used for quay walls, other iron materials, inside faces of sea water conduits such as are used for cooling in power plants, outside faces of such conduits which are in continuous contact with sea water, and structures of sea water intake gates—all of which can be protected against adhesion of aquatic growths and corrosion.

What is claimed is:

1. An adhesive sheet suitable for application to a surface for preventing aquatic growths, comprising: a copper or copper-nickel alloy plate having a weight ratio of copper:nickel in the range of 100:0 to 80:20; a primer layer formed on a major surface of the plate; and a pressure-sensitive adhesive layer formed on the primer layer; wherein the pressure-sensitive layer is composed of elastomer, tackifier resin, filler and cross-linking agent; wherein the primer layer comprises elastomer, tackifier resin, epoxy resin and epoxy resin curing agent, wherein the primer layer includes at least one elastomer selected from the group consisting of modified natural rubber, styrene-butadiene rubber, nitrile rubber and chlorinated rubber and wherein the primer layer comprises 100 parts by weight of elastomer, 20–300 parts by weight of tackifier resin, 30–200 parts by weight of epoxy resin and an epoxy equivalent curing agent.

2. An adhesive sheet according to claim 1; wherein the primer layer contains an anti-degradation agent effective to resist degradation by copper.

3. An adhesive sheet according to claim 1; wherein the pressure-sensitive adhesive layer contains an antioxidant.

4. A method of preventing aquatic growths on an underwater surface, comprising: applying a primer on a surface to be protected; and adhering to the primered surface an adhesive sheet comprised of a copper-nickel alloy plate, a primer layer formed on the alloy plate, and a pressure-sensitive adhesive layer, formed on the primer layer, the adhesive sheet being adhered to the primered surface by the pressure-sensitive adhesive layer wherein the pressure-sensitive adhesive layer is composed of elastomer, tackifier resin, filler, and cross-linking agent, wherein the primer layer is composed of elastomer, tackifier resin, epoxy resin, and epoxy resin curing agent, and wherein the elastomer of the primer layer includes one or more elastomers selected from the group of modified natural rubber, styrene-budadiene rubber, nitrile rubber and chlorinated rubber.

5. A method according to claim 4; wherein the primer applied to the surface to be protected and the primer layer of the adhesive sheet have the same composition.

6. A method according to claim 5; wherein the primer layer contains an anti-degradation agent effective to resist degradation by copper.

7. An adhesive sheet suitable for application to a surface for preventing aquatic growths comprising: a copper or copper-nickel alloy plate having a weight ratio of copper:nickel in the range of 100:0 to 80:20; a primer layer formed on a major surface of the plate; and a pressure-sensitive adhesive layer formed on the primer layer; wherein the pressure-sensitive layer is composed of elastomer, tackifier resin, filler and crosslinking agent, wherein the primer layer comprises elastomer, tackifier resin, epoxy resin and epoxy resin curing agent, wherein the primer layer includes at least one elastomer selected from the group consisting of modified natural rubber, a styrene-butadiene rubber, nitrile rubber and chlorinated rubber.

8. An adhesive sheet for application to a construction for preventing the fouling of the construction's underwater surface by aquatic growths comprising:
   a copper or a copper-nickel alloy plate having a weight ratio of copper:nickel in the range of 100:0 to 80:20;
   a primer layer formed on a surface of the plate; and
   a pessure-sensitive adhesive layer formed on the primer layer;
   wherein the primer layer comprises elastomer, tackifier resin, epoxy resin and epoxy resin curing agent,
   wherein the primer layer includes at least one elastomer selected from the group consisting of modified natural rubber, styrene-butadiene rubber, nitrile rubber and chlorinated rubber, and
   wherein the primer layer comprises 100 parts by weight of elastomer, 20–300 parts by weight of tackifier resin, 30–200 parts by weight of epoxy resin and an epoxy equivalent curing agent.

9. A method of preventing from fouling by aquatic growths the underwater surface of a construction comprising the steps of:
   applying a primer layer on the underwater surface of the construction to be protected; and
   adhering to the primer layer surface an adhesive sheet comprised of a copper or a copper-nickel alloy plate, a primer layer formed on the plate, and a pressure-sensitive adhesive layer formed on the primer layer, the adhesive sheet being adhered to the primer layer on the underwater surface to be protected by the pressure-sensitive adhesive layer,
   wherein the primer layer is composed of 100 parts by weight of elastomer, 20–300 parts by weight of tackifier resin, 30–200 parts by weight of epoxy resin, and an epoxy equivalent curing agent, and
   wherein the elastomer of the primer layer includes one or more elastomers selected from the group of modified natural rubber, styrene-butadiene rubber, nitrile rubber and chlorinated rubber.

* * * * *